United States Patent [19]

Terminiello

[11] 3,973,884

[45] Aug. 10, 1976

[54] MANUFACTURE OF HIGH-DENSITY FOAMED POLYMER

[75] Inventor: Michael A. Terminiello, Mahwah, N.J.

[73] Assignee: BASF Wyandotte Corporation, Wyandotte, Mich.

[22] Filed: Oct. 23, 1974

[21] Appl. No.: 517,271

[52] U.S. Cl. .............................. 425/4 R; 34/57 A; 34/57 B; 34/181; 34/182; 34/187; 264/51; 264/DIG. 9

[51] Int. Cl.² ........................................ B29B 3/00

[58] Field of Search ................ 34/57 A, 57 B, 57 D, 34/10, 181, 182, 187, 36, 37; 264/DIG. 9, 51, 53; 193/15; 425/4 R

[56] References Cited
UNITED STATES PATENTS

| | | | |
|---|---|---|---|
| 1,127,324 | 2/1915 | Vasey | 193/15 |
| 3,023,175 | 2/1962 | Rodman, Jr. | 259/8 |
| 3,040,438 | 6/1962 | Perlman et al. | 34/57 A |
| 3,207,820 | 9/1965 | Scarvelis et al. | 34/37 |
| 3,252,228 | 5/1966 | Ehrenfreund | 34/57 A |
| 3,617,038 | 11/1971 | Schmidt et al. | 34/57 A |

Primary Examiner—John J. Camby
Assistant Examiner—Larry I. Schwartz
Attorney, Agent, or Firm—John W. Linkhauer; Bernhard R. Swick; Robert E. Dunn

[57] ABSTRACT

A method and apparatus are disclosed for the manufacture of foamed polystyrene particles of moderately great density, such as 3 to 25 lbs. per cubic foot (50 to 400 milligrams per cubic centimeter). Beads are fed by a constant-displacement auger to an expander vessel having the form of, in its lowest part, a cylinder with a vertical axis, and thereabove, of a frustrum of an inverted cone having a base angle of about 83° to 70°. Steam is supplied to the vessel in an appropriate, controlled manner. The vessel also contains stator bars, to break lumps and retard the rotation of the material in the vessel, and rotating bars, to provide the necessary agitation. Desirably, the equipment includes a discharge chute of adjustable location, to facilitate adjustment of the residence time and consequently of the density of the expanded beads being produced. With apparatus according to the invention, it is possible to obtain beads substantially uniformly expanded to a desired density within the range indicated above. Such higher-density expanded polystyrene particles find use in various applications, such as shoe soles, or as a substitute for wood.

2 Claims, 2 Drawing Figures

MANUFACTURE OF HIGH-DENSITY FOAMED POLYMER

BACKGROUND OF THE INVENTION

1. Field of the Invention

This invention relates to the manufacture of a cellular synthetic resin (Class 260-2.5), with the use of agitating equipment of a kind having a fixed receptacle, and a rotating, single stirrer, rotating about a fixed vertical axis (Class 259, Sub-classes 8, 106, 108, and 111).

2. Description of the Prior Art

The manufacture of expanded polystyrene particles, particularly ones having a low density of about 2 pounds per cubic foot (33 milligrams per cubic centimeter) or lower, is well known. As commonly practiced, such manufacture involves the use of a method and apparatus as disclosed in the Rodman, Jr., U.S. Pat. No. 3,023,175. Particles of polystyrene containing, for example, about 5.8 to 7.3 weight percent of pentane or a similar suitable blowing agent, are fed to a cylindrical pre-expander vessel and agitated therein, while being treated with steam, to cause the blowing agent to volatilize and the particles to be expanded to a low density. As fed to the pre-expander, the beads have a density of about 39 pounds per cubic foot (625 milligrams per cubic centimeter). As expanded, they have a density on the order of 0.7 to 2 pounds per cubic foot (10 to 33 milligrams per cubic centimeter). Pre-expanded beads of the kind indicated above are then used in various ways known to those skilled in the art. Most typically, they are placed into a mold form, substantially filling the mold, which is closed and supplied with heat, to complete the expansion of the beads and thus form a desired object, such as a polystyrene drinking cup. In some instances, the low-density preexpanded beads are used as such, for example, as fillings for bean bags or as filler material in packaging.

Those skilled in the art have realized that higherdensity expanded-polystyrene material would be useful in various applications for which the low-density material cannot be used. For items such as shoe soles, panels for use in making furniture, and other objects now made of metal, plastic, or wood, the low-density material has inadequate compressive strength. Moreover, when attempts were made to operate the usual cylindrical pre-expander equipment of the kind generally used for making the low-density polystyrene, with the object of obtaining a higher-density product, the results were unsatisfactory. A product was obtained which contained a substantial proportion of particles expanded to the desired degree, but in admixture with particles of substantially different density, including a noticeable proportion of unexpanded beads. For practically all purposes, such a non-uniform product is undesirable. If the product were more nearly uniform, it would be possible to get a desired level of compressive strength at a somewhat lower average density, thereby saving material. Prior to this invention, a uniform product could be produced only by taking additional steps to improve the uniformity of the product, and such additional steps are unsatisfactory because they add to the cost of the product, not only because of the cost of the operation but also because of the necessity of recycling or otherwise disposing of the beads which failed to expand. If the beads fed to the pre-expander are of a very nearly uniform size, a separation by screening is possible, but with present technology, the cost of screening, both before and after, to obtain a uniform high-density product in this way would be too great to make the process commercially attractive. The same is true with regard to the possibility of separating the particles of undesirably low or high density by trajectory separation or classification.

The prior art has lacked a method and an apparatus whereby high-density pre-expanded polystyrene particles of substantially uniform density, such as 130 to 190 milligrams per cubic centimeter, or 260 to 320 milligrams per cubic centimeter, could be produced readily and conveniently.

Although the above mentioned patent, U.S. Pat. No. 3,023,175 teaches that a reaction vessel of other form "such as hemispherical or conical" could be used, it does not disclose the particular apparatus features found necessary by the applicant for the production of the desired, uniform, high-density product. It contains no appreciation or suggestion of the applicant's method for obtaining such a product conveniently.

DESCRIPTION OF THE DRAWINGS

A complete understanding of the invention may be obtained from the foregoing and following description thereof, taken together with the accompanying drawings, in which.

DESCRIPTION OF THE PREFERRED EMBODIMENTS

Figure 1:
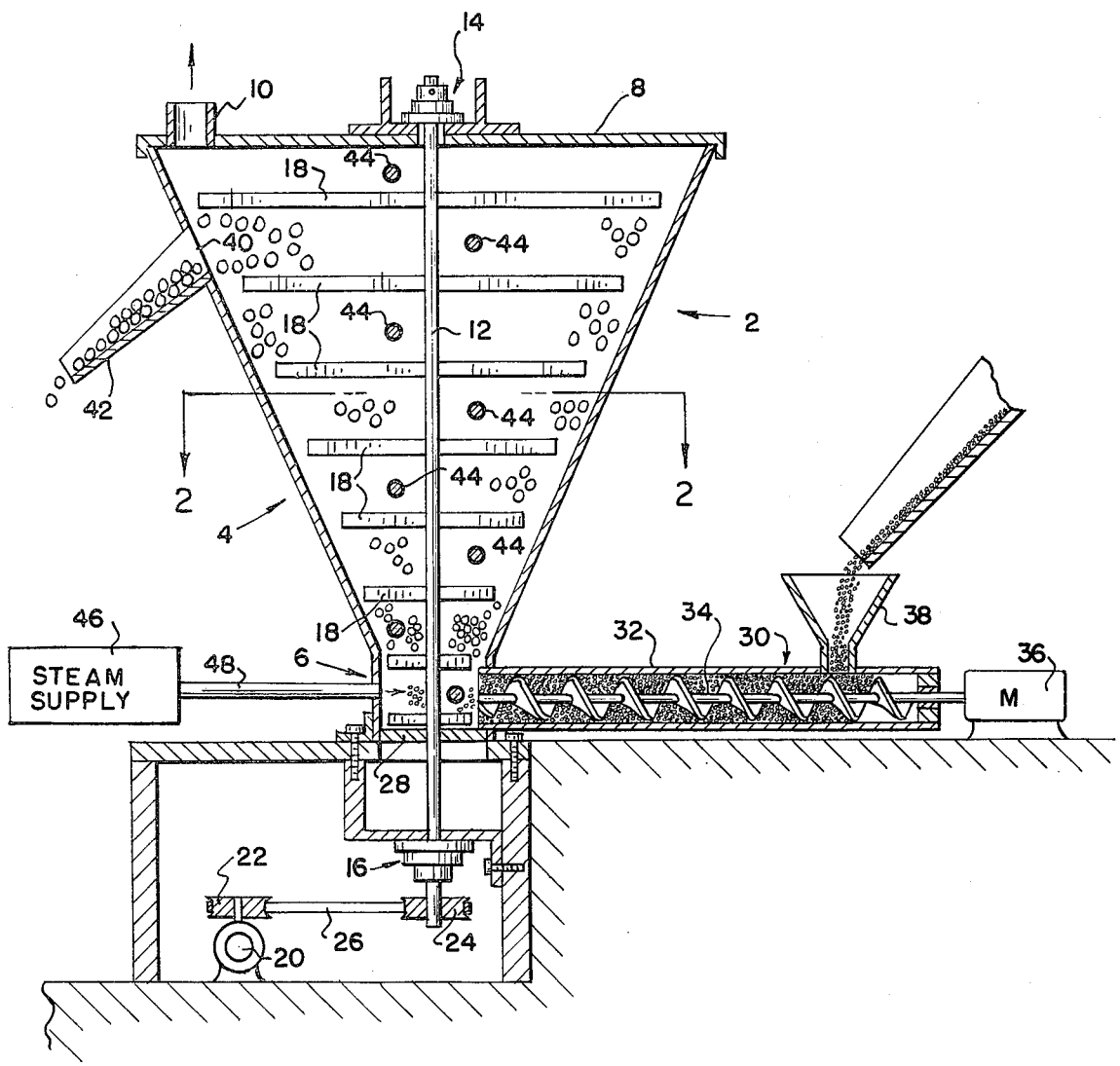
FIG. 1 is a central vertical sectional view, partly diagrammatic, of one form of apparatus according to the invention.
Figure 2:
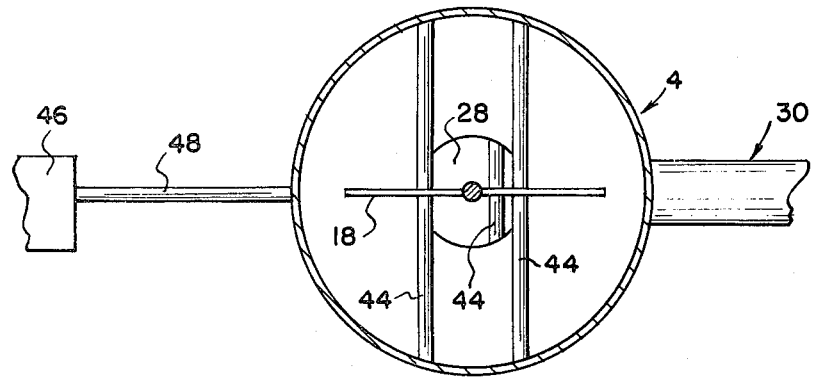
FIG. 2 is a sectional view taken on the line 2—2 of FIG. 1.

The present invention is particularly concerned with the manufacture of relatively high-density partially expanded beads or particles of polymeric materials. Although the invention is particularly concerned with polystyrene, those skilled in the art will appreciate that its teachings apply to the expansion of beads of other polymeric material, such as copolymers of styrene and acrylonitrile, or even to expanded high-density polyethylene.

There are known procedures for producing a desired quantity of unexpanded but expandable beads of polystyrene. Such beads consist of polystyrene together with an appropriate proportion of a solvent or blowing agent, such as pentane or any other proper material which (a) has the ability to dissolve polystyrene and (b) has a boiling point below the softening point of the polymer. Typically, material intended to be fed to a pre-expander is in the form of free-flowing beads having a diameter of about 0.5 to 3.0 millimeters, with a range of about 1.8 to 0.7 millimeters for the difference in diameter between the largest and the smallest beads in the material. Thus, large beads may range from 1.2 millimeters to 3.0 millimeters in diameter, and very small beads may range from 0.5 to 1.2 millimeters in diameter.

In general, it is preferable to use rather small beads for the manufacture of higher-density parts, since they will pack somewhat more closely.

In beads intended for higher-density applications, it is possible and usually desirable to use relatively less of the pentane or other blowing agent than has hitherto been used in making beads for the prior-art low-density applications. The difference is small. Where beads for low-density expanded polystyrene may contain 6.0 to 7.2 weight percent of pentane, beads for high-density material may contain 5.8 to 7.0 weight percent of pentane, or 5.6 to 6.8 percent.

In conducting a pre-expansion of expandable polystyrene beads, attention should be paid to the matter of the extent to which air is introduced to the pre-expander chamber along with the beads and the steam. At least some air is inevitably introduced, being entrained in space between beads; this amount is smaller if the beads are themselves quite small. Different kinds of feeding equipment are known, and they differ in their characteristics in regard to the tendency to introduce air. A Venturi feeder introduces a considerable quantity of air. Somewhat less is introduced by an auger feeder of a known kind that is not kept full of beads. Still less air is introduced by an auger of the known kind that is kept completely full of beads. Any of these kinds of feeder may be used in appropriate circumstances, when care is taken at the same time to use steam of a correspondingly appropriate pressure and at a correspondingly appropriate supply rate.

The heat for the pre-expansion is largely supplied by the condensation of steam, which yields about 980 Btu per pound or 540 kilo calories per kilogram. The polystyrene softens at temperatures very close to 100°C. and begins to degrade at temperatures not much greater, so that it is in any event desirable to avoid exposing the beads to any temperature greater than 110°C. It is thus desirable to use a steam system that will supply steam at a suitable low pressure such as 2 to 30 pounds per square inch gauge, or from slightly over one to 3 atmospheres, and considering the air which may be permitted to enter the vessel, at a temperature on the order of 95° to 102°C.

In common with prior-art practices for producing low-density polystyrene beads, there is used a pre-expander vessel having a stirring means that rotates about a fixed vertical axis and has a number of legs that are interspersed with a number of other bars or suitable members, sometimes called stator bars, that serve to break lumps and tend to retard the rotation of the mass of beads in the pre-expander vessel.

As those skilled in the art will readily understand, the rate of feeding beads to the pre-expander vessel needs to be coordinated suitably to its size (or effective size—there is preferably used an adjustable-height discharge chute) so that the residence time of a typical bead within the vessel will be suitably shorter than the time that is customarily required for the production of beads expanded to a low density such as under 33 milligrams per cubic centimeter. Moreover, the rate of supplying heat to the pre-expander vessel is understandably somewhat less in the case of the production of the desired higher-density pre-expanded polystyrene beads than it is in the usual case of making low-density polystyrene beads. There is need for a relatively somewhat more precise control of the flow of steam, if beads uniformly close to the desired density are to be obtained reliably.

Still another feature in accordance with the invention is the use of an expander vessel having an appropriate shape. In contrast with the expander vessels of the prior art, which were merely in the form of a right cylinder having a vertical axis, the present invention includes the use of a vessel having a lower and relatively small-diameter portion of such right cylindrical shape, but extending only about 3 to 15% of the effective height of the vessel, and above that, an additional portion generally in the shape of the frustrum of an inverted cone having a base angle on the order of 7° to 20°. Beads are fed to the lower, cylindrical portion of the vessel and as they are treated with steam and begin to expand and be raised as a result of the addition of other beads below them, they are subjected to a relatively diminished pressure, because the outward flaring of the sides of the vessel effectively decreases the upward velocity of the steam, also introduced to the lower, cylindrical portion of the vessel, and this makes it relatively less likely that a heavy, unexpanded bead will be carried rapidly to the surface of the material in the pre-expander vessel and thus prematurely discharged. The objectives of the invention are aided by providing the abovementioned lower, cylindrical portion, in that this provides a region for initially bringing together somewhat more intimately the steam, which is hot, and the beads as they are fed, which are normally at about room temperature.

Of even greater importance is the frustroconical, outwardly flaring portion of the vessel above the cylindrical portion discussed above. It has developed that the use of such a feature is of great importance, whenever an effort is made to produce beads pre-expanded relatively uniformly to a relatively high density, such as close to 100 milligrams per cubic centimeter. A bead expanded from 625 to 160 or 80 milligrams per cubic centimeter is still only four to eight times its original volume, whereas a bead expanded to 32 or 10 milligrams per cubic centimeter is 20 to 60 times its original volume, and generally three to five times the size of most of the beads in the vessel. Accordingly, though it is relatively easy, even with a straight-sided cylindrical vessel, to obtain good separation of fully expanded low-density beads from the bulk of the lesser expanded or unexpanded beads in the vessel when such low-density material is being made, it is very much more difficult to obtain an appropriate separation when a closely sized, denser product is being made. In general, it has proven difficult to obtain a product free of unexpanded beads from the cylindrical expanders of the prior art when the average density of the product is any higher than 3 lbs. per cubic foot (about 50 milligrams per cubic centimeter). Apparatus according to the invention has been operated, yielding a product of apparently uniform, desired density, free of unexpanded beads and free of beads overly expanded, i.e., into the range of density of 50 milligrams per cubic centimeter or less.

Referring now to the drawings, there is indicated a pre-expander 2 having an upper portion 4 which is generally in the form of the frustrum of an inverted cone and a lower portion 6 which is in the form of a right cylinder. The frustroconical portion 4 has sides which are at an angle of 7° to 20° with respect to the vertical, and preferably about 15° to 16°. In other words, the cone has a base angle of 70° to 83°, preferably about 74° or 75°. The top of the pre-expander is closed with a suitable shell 8 containing a port 10 to permit the escape of steam and hot air. A central shaft 12 is suitably journaled in bearings 14, 16 for rotation about a vertical axis and has attached to it a number of blades 18 which serve, when the shaft 12 is rotated, to agitate material contained within the pre-expander 2. The blades 18 may be of any suitable shape, and if desired, they may have attached to some or all of them additional members (not shown) to increase the agitation caused by their rotation and ensure the break-up of incipient clumps of beads. The blades 18 may also have end portions (not shown) that conform to the sides of the portions 4 and/or 6 to give a scraping action, but in many instances this is not necessary. Suitable means are provided for rotating the shaft 12, such as the motor 20, connected through the sheaves 22, 24, and the belt 26 to the shaft 12. A plate 28 closes the bottom of the pre-expander 2.

Material is fed to the pre-expander 2 through feeder apparatus generally indicated at 30, and comprising a tube 32 having positioned therein a feed auger 34 which is driven by a motor 36. Leading into the tube 32 is a feed hopper 38.

Located within the upper frustroconical portion 4 of the pre-expander 2 is a discharge opening 40, preferably having associated with it a discharge chute, as indicated at 42. Preferably means are provided so that the discharge opening 40 may be positioned at different heights along the extent of the frustroconical portion 4. Details of construction permitting the adjustment of the location of the discharge opening are not shown, in the interest of conciseness, as it is considered that it is within the skill of the art to provide an adjustment means that will operate satisfactorily.

Within the pre-expander tube, there are provided a plurality of stator bars 44, which serve to break lumps and to retard the rotation of material within the pre-expander 2.

The apparatus also includes a steam supply 46 and one or more lines 48 by which steam of appropriate temperature and pressure may be led to the portion 6 of the pre-expander 2. It is usually preferable to introduce steam at a plurality of sites around the periphery of the portion 6.

The apparatus described above may be operated as follows.

The motor 20 is caused to revolve the shaft 12 at a suitable rate of rotation, such as 80 to 250 revolutions per minute, and steam is supplied to the portion 6 through the line 48, at first quite slowly, and then more rapidly, as the operation progresses, until a steady operation state is achieved. At the same time, suitable beads or particles of expandable polystyrene are fed to the hopper 38 and the motor 36 is operated to cause the feed auger 34 to convey the particles of polystyrene into the pre-expander 2. By the operation of the equipment, the particles of expandable polymer are intimately contacted in the portion 6 of the pre-expander with steam, which may be at a suitable pressure, such as 2 to 30 lbs. per square inch gauge and at an appropriate temperature, such as 95° to 102°C. For a pre-expander unit having a gross internal capacity on the order of 325 to 375 cubic decimeters, and, considering the location of the discharge opening 40, an effective internal volume on the order of 210 to 230 cubic decimeters (55 gallons), it will be appropriate to operate the pre-expander by feeding expandable beads at a rate such as 130 to 140 kilograms per hour and feeding steam at a rate on the order of 65 to 100 kilograms per hour, most commonly about 65 to 80 kilograms per hour. As a rule of thumb, a given weight of beads can be expanded with a weight of steam about half as great, but in some circumstances, such as where the steam is relatively cool or at low pressure or mixed with relatively greater proportions of air, relatively more steam is needed.

Although in many instances it is desirable, as indicated above, to minimize the amount of air introduced into the pre-expander 2 with a view to minimizing the consumption of steam, it will sometimes be desirable to introduce air along with the beads through the tube 32, especially when beads are fed at a relatively low feed rate, to prevent steam from migrating out of the tube 32 and causing bridging of the beads in the feed hopper 38.

In the design of equipment of this kind, it is in general preferable to adopt dimensions such that the diameter at the midsection of the frustroconical portion 4 is about 0.5 to 1.1 times the effective height of the expander unit, with values in the vicinity of 0.7 to 0.9 being preferred. With low values of this ratio, the equipment is relatively tall, and this leads to problems such as relatively greater heat losses and relatively greater back pressure exerted by material in the portion 6 upon material entering portion 6 through the feed tube 32. On the other hand, high values of the ratio give a relatively squat vessel and thus provide less vertical space for the separation of beads of different densities and thus lead to greater likelihood of having a greater range of densities in the product pre-expanded material.

In general, the small-diameter right cylindrical portion 6 may have a height only sufficient to match the diameter of the feed tube 32, and it is usually not desirable to make it any taller than is necessary for that purpose. Its diameter may conveniently be kept to about one fifth to one tenth that of the top shell 8. If its diameter is too great, there may be inadequate contact between the steam and the beads as they enter the pre-expander, and if it is too small, the danger of overheating the beads is increased.

In accordance with one possible modification of the invention, the shaft 12 is made in two co-operating parts and provided with separate drive means at its opposite ends, to permit the rotation of one family blades 18 in the upper part of the vessel 2 at a velocity higher or lower than that of the velocity of a separate family of blades 18 in the lower part of the vessel 2. In accordance with another modification of the invention, the port 10 is connected to the eye of a blower or other suitable means that provides a partial vacuum in the vicinity of the port 10. This assists in the positive removal of spent vapors and tends to give a better-dried product. Various other modifications and equivalents will suggest themselves to those skilled in the art.

Those skilled in the art will also appreciate that as blowing agents, there may be used pentane or a fluorinated lower hydrocarbon (Freon), or mixtures thereof.

Equipment of the kind described above may be operated to yield a product having an average density such as 50 to 500 milligrams per cubic centimeter, with the product being sufficiently uniform that individual particles do not differ from the average value by more than 30 or 50 milligrams per cubic centimeter. In general, with proper adjustment of the location of the discharge opening 40, the pressure or rate of supply of the steam through the line 48, or the speed of rotation of the feed auger 34, it is possible to bring the degree of expansion of the product to a desired value. For example, if the product is somewhat denser than desired, the location of the discharge opening 40 may be raised, or the rate of supply of steam may be increased, or the pressure of the steam may be increased, or the rate of feeding material through the feed auger may be increased. In cases where the product being made is less dense than desired, the corresponding opposite actions may be taken.

While I have shown and described above certain embodiments of my invention, I intend to cover as well any change or modification therein that may be made without departing from its spirit and scope.

The embodiments of the invention in which an exclusive property or privilege is claimed are defined as follows:

1. Apparatus for producing a quantity of small particles of expanded polymer substantially uniformly expanded to a desnity on the order of one-half to one-thirteenth of its average density as unexpanded, said apparatus comprising, in combination, a vessel having a first, lower, small-diameter portion in the form of a right cylinder and thereabove a second frustroconical portion having thereabove a top shell and having an interior in the form of a frustrum of an inverted cone having a base angle of 70° to 83°, said first portion having therein a feed opening and said second portion having therein a discharge opening, the effective height of said vessel from its bottom to said discharge opening being related to the diameter of the midsection of said frustroconical portion such that said midsection diameter is 0.5 to 1.1 times said effective height, said first portion having a diameter one-fifth to one-tenth that of said top shell, means for feeding unexpanded particles of polymer and steam to said first portion of said vessel, a central vertically extending shaft within said vessel and journaled for rotation about a vertical axis, said shaft having affixed to it a plurality of blade members extending outwardly therefrom towards and into close proximity to the walls of said vessel, a plurality of stationary bar members mounted within said vessel in non-interfering relationship with said plurality of blade members affixed to said shaft, and means for rotating said shaft at a velocity adequate to provide suitable agitation of said particles of polymer when said vessel is used to heat and expand said particles.

2. Apparatus as defined in claim 1, where said means for supplying steam supplies steam at 2 to 30 pounds per square inch gage and a temperature of 95° to 102°C and at a rate of 0.5 to 1 pound of steam per pound of unexpanded particles fed to said first portion.

* * * * *